(12) United States Patent
Gerber et al.

(10) Patent No.: US 8,811,395 B2
(45) Date of Patent: *Aug. 19, 2014

(54) SYSTEM AND METHOD FOR DETERMINATION OF ROUTING INFORMATION IN A NETWORK

(71) Applicant: AT&T Intellectual Property I, L.P., Atlanta, GA (US)

(72) Inventors: Alexandre Gerber, Madison, NJ (US); Lee Breslau, Basking Ridge, NJ (US); Subhabrata Sen, New Providence, NJ (US); Nicholas Duffield, Summit, NJ (US); Carsten Lund, Berkeley Heights, NJ (US); Cheng Ee, Rockaway, NJ (US); Amogh Dhamdhere, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,723

(22) Filed: Jan. 14, 2013

(65) Prior Publication Data

US 2013/0132608 A1 May 23, 2013

Related U.S. Application Data

(63) Continuation of application No. 12/335,868, filed on Dec. 16, 2008, now Pat. No. 8,477,772.

(51) Int. Cl.
*H04L 12/56* (2006.01)
*H04L 12/54* (2013.01)

(52) U.S. Cl.
CPC ..................................... *H04L 12/56* (2013.01)
USPC .......................................... 370/389; 370/392

(58) Field of Classification Search
CPC ......... H04L 47/10; H04L 47/35; H04L 43/50; H04L 12/56; H04L 12/5689; H04W 24/00
USPC ......... 370/229, 230, 231, 232, 233, 235, 241, 370/252, 351, 352, 356, 357, 360, 389, 392, 370/395.1, 395.5, 395.52
See application file for complete search history.

(56) References Cited

U.S. PATENT DOCUMENTS

| | | | |
|---|---|---|---|
| 6,735,173 B1 * | 5/2004 | Lenoski et al. ............... 370/235 |
| 6,748,349 B1 | 6/2004 | Majumdar et al. |
| 7,027,448 B2 | 4/2006 | Feldmann et al. |
| 7,145,871 B2 | 12/2006 | Levy et al. |
| 7,193,968 B1 | 3/2007 | Kapoor et al. |
| 7,251,215 B1 | 7/2007 | Turner et al. |

(Continued)

OTHER PUBLICATIONS

Alex Henthorn-Iwane; Going Beyond the Flow: Giving Network Engineers the Tools to Think Act Globally; SearchNetworking.com. au; 2008; TechTarget ANZ.

(Continued)

*Primary Examiner* — Obaidul Huq

(57) ABSTRACT

A system and method to use network flow records to generate information about changes in network routing and to understand the impact of these changes on network traffic. The inferences made can be determinative, if sufficient information is available. If sufficient information is not available to make determinative inferences, inferences may be made that narrow the range of possible changes that may have occurred to network traffic and the underlying network.

15 Claims, 4 Drawing Sheets

(56) References Cited

U.S. PATENT DOCUMENTS

| | | |
|---|---|---|
| 7,269,157 B2 | 9/2007 | Klinker et al. |
| 7,382,769 B1 * | 6/2008 | Rijsman ..................... 370/352 |
| 7,420,929 B1 * | 9/2008 | Mackie ...................... 370/252 |
| 7,782,793 B2 * | 8/2010 | Olesinski et al. ........... 370/253 |
| 2002/0145981 A1 | 10/2002 | Klinker et al. |
| 2006/0168207 A1 | 7/2006 | Choong et al. |
| 2007/0201359 A1 | 8/2007 | Matsubara et al. |
| 2007/0258372 A1 | 11/2007 | Nadeau et al. |
| 2007/0280197 A1 | 12/2007 | Pearlman et al. |
| 2008/0002697 A1 * | 1/2008 | Anantharamaiah et al. .. 370/392 |
| 2009/0144414 A1 | 6/2009 | Dolisy |
| 2009/0154363 A1 | 6/2009 | Stephens |

OTHER PUBLICATIONS

Packet Design; Packet Design's 'VPN Traffic Explorer' Gives Service Providers Critical Visibility Into Layer 3 MPLS-VPNs; redorbit.com; Jan. 28, 2008.

* cited by examiner

SYSTEM AND METHOD FOR DETERMINATION OF ROUTING INFORMATION IN A NETWORK

CROSS REFERENCE TO RELATED APPLICATIONS

This application is a continuation of U.S. patent application Ser. No. 12/335,868 entitled "System and Method for Determination of Routing Information in a Network," by Alexandre Gerber et al., filed on Dec. 16, 2008, issued on Jul. 2, 2013 as U.S. Pat. No. 8,477,772, the disclosure of which are hereby incorporated by reference herein in their entirety.

BACKGROUND OF THE INVENTION

1. Field of the Invention

The present invention is directed generally to data packet networks. In particular, the present invention is directed to methods for generating routing information.

2. Description of the Related Art

In a packet switched network, routing protocols determine the path that packets traverse through the network. These routing protocols react to changes in the network (e.g., links going up and down, or link costs changing) and adjust the routes taken by packets through the network. The routing protocols are often distributed, in that they are implemented in a coordinated fashion by many routers in the network. The routing protocols are also dynamic, in that they react to changes in the network. As such, the routes taken by packets will change over time, often in unanticipated ways. In such a network, it is important to understand the nature of routing changes, as these changes impact the stability of the network and the level of service (i.e., loss and delay) experienced by packets. Network operators and service providers have invested a great deal in understanding the dynamics and stability of routing within their networks.

Previous approaches to monitoring the state of routing in the network include: 1. Monitoring of routing protocol message exchanges by specialized route monitors, then inferring the state of routing in the network based on the protocol messages; 2. Monitoring of router log messages that identify when events (e.g., link failures) have occurred; and 3. Active end-to-end measurement of the data plane to infer the stability and performance of the network. The approaches 1 and 2 measure the control plane directly but are unable to give precise information about the data plane on short time scales. That is, they can identify that changes have occurred, but they can neither precisely assess the impact of those changes nor can they necessarily determine when the impact was experienced at each individual router. The third approach measures the impact of routing changes on the data plane, but only in a coarse and imprecise manner.

BRIEF DESCRIPTION OF THE SEVERAL VIEWS OF THE DRAWING(S)

DETAILED DESCRIPTION OF THE INVENTION

In the Figures, various objects are identified with reference numbers. If there are multiple instances of the same object in a figure, they will be referred to by the same reference number but with a different suffix number appended. In the following discussion, if a reference is made to a reference number that identifies multiple objects but without a suffix number appended, then the reference is to all the multiple objects as a group.

Figure 1:
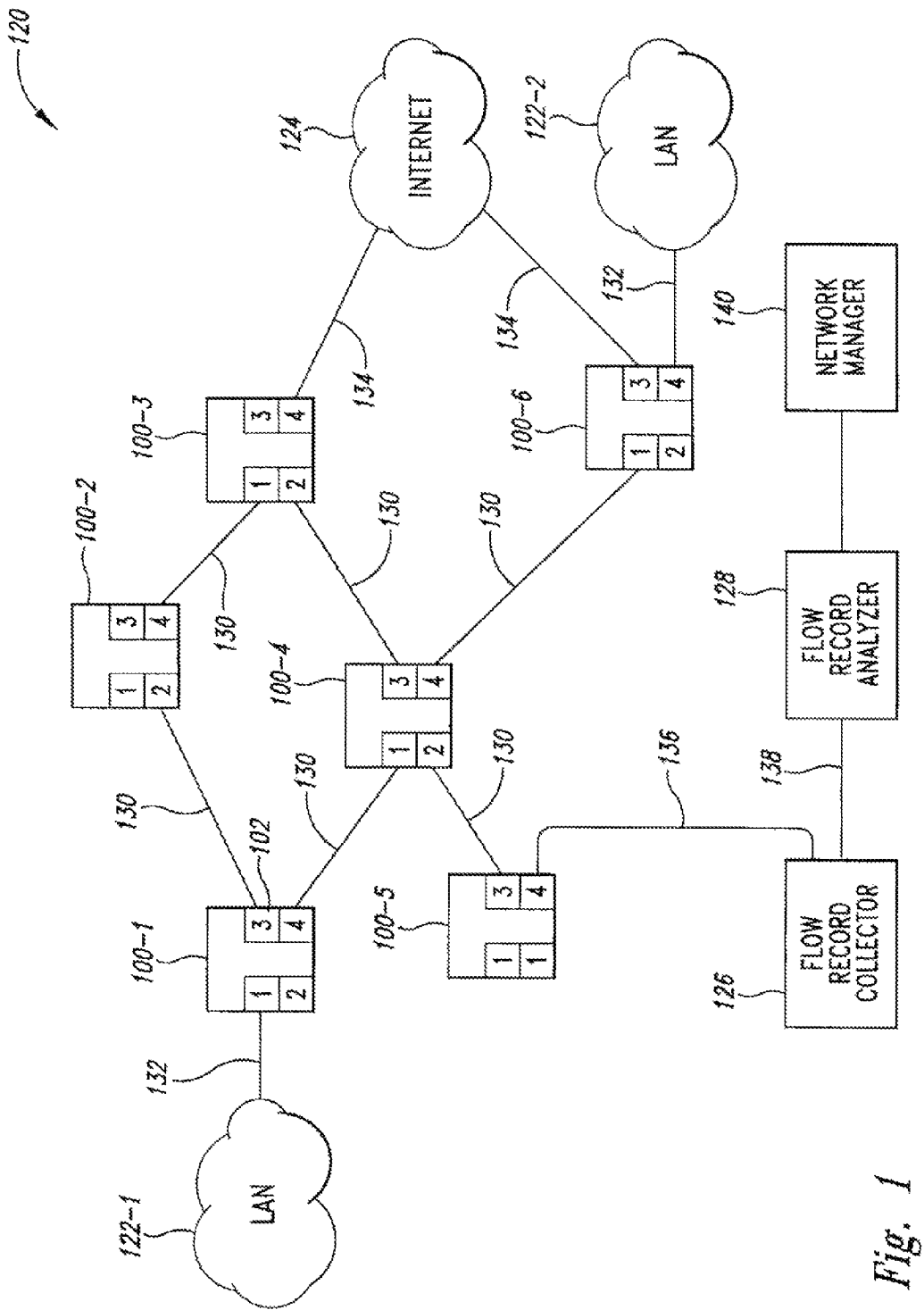
FIG. 1 shows a data packet network with elements enabling generation of network routing information based on analysis of flow records.

FIG. 1 shows a data packet network 120 with elements enabling generation of network routing information based on analysis of flow records. The exemplary data packet network 120 has a set of six routers (100-1 through 100-6). In other embodiments, the network 120 may have more or fewer routers. The routers (100-1 through 100-6) are connected to one another through communication links 130. The exemplary data packet network 120 is connected to two Local Area Networks (LANs) 122-1 and 122-2 through communication links 132 and is connected to internet 124 through communication link 134. The data packet network 120 includes flow record collector 126 and a flow record analyzer 128. The flow record collector 126 is connected to the routers (100-1 through 100-6) through communication link 136 and an interface 102 on one of the routers 100-5. In this exemplary embodiment, flow record analyzer 128 and flow record collector 126 are hosted in physically separate servers and connected through communication link 138. In other embodiments, the flow record collector 126 and flow record analyzer 128 are hosted in a single server and are physically connected through a server internal communication bus. A network manager 140 is communicatively coupled with the flow record analyzer 128.

The routers (100-1 through 100-6) in the exemplary network 120 are in a single autonomous system, managed by a single network operator. The internet 124 comprises other autonomous system networks, similar to the exemplary network 120, but managed by other network operators. The LANs 122-1 and 122-2 that are connected to the exemplary network 120 may be managed by the same network operator as the exemplary network 120 or may be managed by a different network operator.

Figure 2:
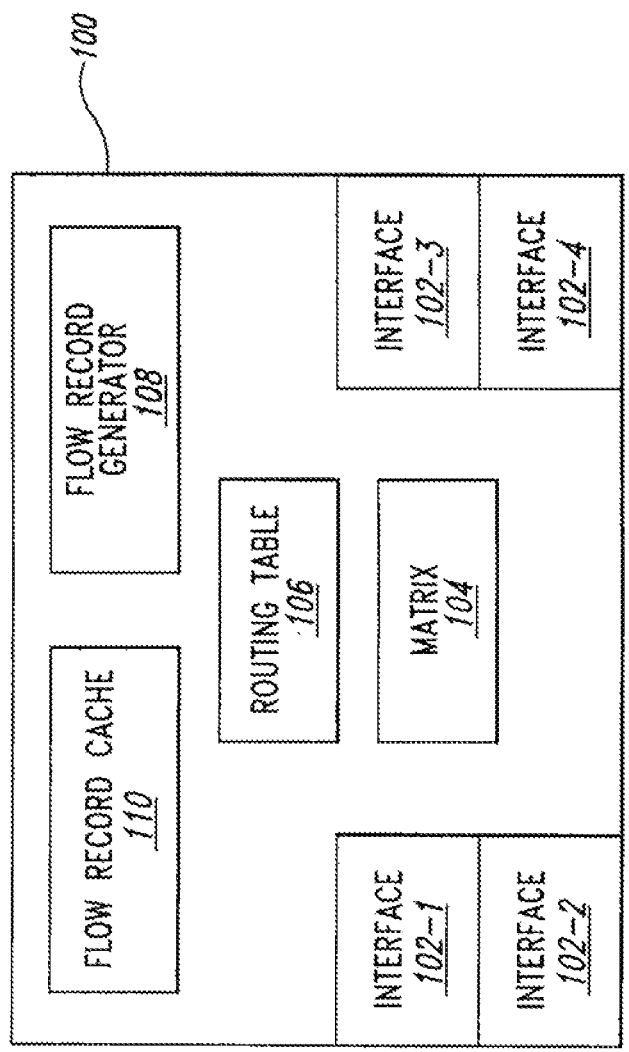
FIG. 2 shows a router with the ability to generate flow records.

FIG. 2 shows a router 100 typical of the kind used in packet data networks. The router 100 is shown with four interfaces 102-1, 102-2, 103-3, and 102-4, but may have more or fewer interfaces. Each of the interfaces 102-1, 102-2, 102-3, and 102-4 are configured to receive and transmit data packets. Packets received from one of the interfaces (e.g., 102-1) are transmitted out of another one of the interfaces (e.g., 102-4). The router 100 has a matrix 104 that takes a packet received by one interface (e.g., 102-1) and sends the packet to another interface (e.g., 102-4). The matrix 104 is configured to decide to which of the interfaces 102-1, 102-2, 102-3, and 102-4 to send the packet based on a destination address located in a header in the packet and based on an entry in a routing table 106 for that destination address. The router 100 has a flow record generator 108 and a flow record cache 110. The flow record generator 108 is a software module hosted in the router 100 configured to collect data regarding properties of packets flowing through the router and generate flow records based on the properties of the packets. The flow record generator 108 may be configured to collect data for some packets (in the case of sampling) or all packets (without sampling) passing through the router 100. Sampling eases the computation burden on the router 100. The flow record cache 110 is configured to store flow records and is configured to export each flow record when the flow record is complete.

Figure 3:
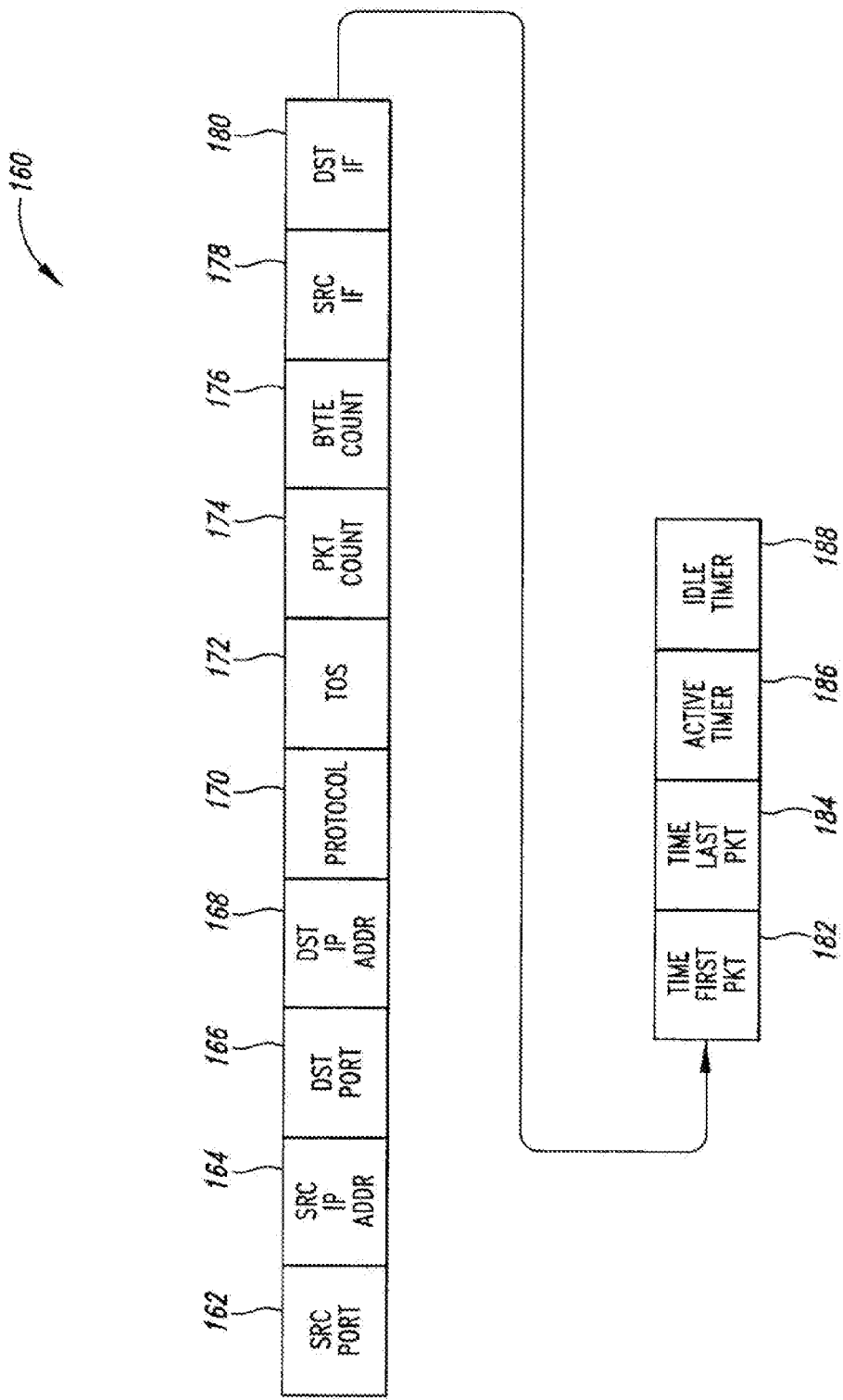
FIG. 3 shows a structure of a flow record.

FIG. 3 shows a structure of a typical flow record 160 including component fields. A flow is a unidirectional sequence of packets all sharing source IP address, destination IP address, source port and destination port. In some embodiments, the packets must have the same protocol and type of service indicated in their headers to be considered part of the same flow. The structure of a typical flow record includes a source port field 162, a source IP address field 164, a destination port field 166, a destination IP address field 168, a protocol field 170, a type of service field 172, a packet count field 174, a byte count field 176, a source interface field 178, a destination interface field 180, a first packet timestamp field 182, a last packet timestamp field 184, an active flow timer field 186 and an idle flow timer field 188. Other embodiments may have additional fields or fewer fields. The information in the flow record 160 is useful for understanding network behavior. The source address indicates the origin of the flow and may identify a particular entity. The destination address tells who is to receive the flow. Information in the port fields 162 and 166 can be used to characterize the application utilizing the flow. The type of service field 172 indicates the priority of the flow. The packet count field 174 and the byte count fields give an indication of the amount of traffic that has passed with the flow. The source interface field 178 records an identity of an interface (e.g., 102-1) on which the packets in the flow arrived at the router 100 and the destination interface field 178 records an identify of an outgoing interface (e.g., 102-4) on which the packets were transmitted.

Returning to the discussion of FIG. 2, the flow record cache 110 is configured to store flow records. When the generation of a flow record is complete, the flow record cache 110 is configured to export the record. The generation of a flow record is complete when the flow record generator 108 determines that the flow associated with the flow record has terminated or timed out. A flow has terminated if the flow record generator 108 detects information in a packet header that indicates the flow has been terminated (e.g., detection of a set FIN or RST flag in TCP). A flow has timed out if the flow record generator 108 determines that one of the timer fields 186 and 188 for that flow has exceeded a threshold. The flow record generator 108 is configured to start a count in the active flow timer field 186 and the idle timer field 188 when the flow is first detected. The idle timer field 188 is reset each time the flow record generator 108 detects a packet belonging to the flow. Once the flow record cache 110 has exported the flow record, there is no copy of the record left in the router 100. In some embodiments, the flow record cache 110 can be configured to export a copy of a flow record periodically or upon some triggering event, regardless of whether the flow record is complete. In this case, the flow record cache 110 retains its copy of the flow record and only exports a copy.

Returning to FIG. 1, the flow record collector 126 is configured to receive flow records from the routers (100-1 through 100-6) and store the flow records 160 in a data structure, such as a database. The flow record analyzer 128 is configured to request and receive copies of flow records stored in the flow record collector 126. In some embodiments, the flow record analyzer 128 is configured to request and receive copies of flow records directly from the routers (100-1 through 100-6).

The flow record analyzer 128 is configured to generate routing information based on the flow records 160. The flow record analyzer 128 can make inferences that are determinative, if sufficient information is available. If sufficient information is not available to make determinative inferences, inferences may be made that narrow the range of possible changes that may have occurred to network traffic and the underlying network. For example, with sufficient information, the flow record analyzer 128 can determine the exact path that a flow takes through the network 120, but even if the information possessed by the flow record analyzer is insufficient to determine the exact path, the flow record analyzer 128 may be able to narrow the possible paths from more than a dozen possible paths down to two or three possible paths.

The flow record analyzer 128 is configured to generate routing information regarding routing table entries. From a single flow record 160 (see FIG. 3), the flow record analyzer 128 can use the information in the source interface field 162 and destination interface field 166 along with network configuration information to determine the previous and next hop routers for packets in the flow associated with the flow record 160. Thus, for a single router (e.g., 100-4), one can infer entries in the routing table 106 for each flow reported by the flow record generator 108 in that router (e.g., 100-4). That is, for a given destination, one can infer the next hop towards that destination at that router (e.g., 100-4). For an example of generating routing information from a single router 100, router 100-4 exports a first flow record 160 to the flow record collector 126. The flow record analyzer 128 obtains a copy of the first flow record 160 for analysis. In this first flow record 160, the source interface field 178 has a value associated with interface number 1 of router 100-4. The destination interface field 180 has a value associated with interface number 4 of router 100-4. The destination IP address field 168 is an IP address associated with LAN 122-2. The flow record analyzer 128 then infers that the routing table 106 of the router 100-4 includes an entry for the IP address associated with LAN 122-2 and that the entry has a routing directive to forward packets with this destination address to interface 4.

The flow record analyzer 128 is configured to generate routing information about routing changes in a router (e.g., 100-4). By monitoring flow records 160 from a router (e.g., 100-4) over a period of time and detecting changes between flow records 160, the flow record analyzer 128 can infer when routing changes occur at the router (e.g., 100-4). Continuing the example above, router 100-4 exports a second flow record 160 to the flow record collector 126 sometime after exporting the first flow record 160. This second flow record happens to be for a different flow to the same destination, but from a different source. The flow record analyzer 128 obtains a copy of the second flow record 160 for analysis. In this second flow record 160, the source interface field 178 also has the value associated with interface number 2 of router 100-4. The destination IP address field 168 is also the IP address associated with LAN 122-2. However, the destination interface field 180 has a value associated with interface number 3 of router 100-4. The flow record analyzer 128 can infer that the entry in the routing table 106 of router 100-4 for the IP address associated with LAN 122-2 has a changed routing directive that now directs packets with this destination address to interface 4. The flow record analyzer 128 is configured to make an inference about the time of the change in the routing table entry based on the last packet timestamp field 184 in the first flow record and the first packet timestamp field 182 in the second flow record, since the change would have occurred between those two times.

While the flow record 160 from a single router (e.g., the router 100-4) provides information about the operation of that router, it does not by itself provide information regarding the network 120 as a whole. However, with flow records 160 from each router 100 in the network 120, the flow record analyzer 128 can make determinations regarding the entire network 120. The flow record analyzer 128 is configured to generate routing information, including information about end-to-end paths of data packet flows through the network 120. By examining flow records across multiple routers (e.g., 100-1, 100-4, and 100-6), the flow record analyzer 128 can make an inference about an end-to-end path of a particular flow. For example, router 100-1 generates and exports a first flow record 160. In this first flow record 160, the source interface field 178 has a value associated with interface number 2 of router 100-1. The destination interface field 180 has a value associated with interface number 4 of router 100-1. The destination IP address field 168 has an IP address associated with the LAN 122-2. Router 100-6 generates and exports a second flow record 160. In this second flow record 160, the source interface field 178 has a value associated with interface number 1 of router 100-6. The destination interface field 180 has a value associated with interface number 4 of router 100-6. The source port field 162, the source IP address field 164, the destination port field 166 and the destination IP address field 168 of the second flow record each match the respective fields of the first flow record, indicating the first and second flow records are associated with the same flow. The flow record analyzer 128 obtains a copy of the first and second flow records 160 for analysis. The flow record analyzer 128 has knowledge of the topology of the network 120. Based on this knowledge of network topology and the first and second flow records, the flow record analyzer 128 can infer the end to end path of the flow. Specifically, it can determine that the flow enters the network 120 from LAN 122-1 on communication link 132 connected to interface 2 of router 100-1, exits router 100-1 through interface 4, enters router 100-4 through interface 1, exits router 100-4 through interface 4, enters router 100-6 through interface 1, exits router 100-6 on interface 4, and is carried by communication link 132 to LAN 122-2. Note, that if the topology of the network 120 was different, such as there had been more than a single router 100 between router 100-1 and router 100-6, the flow record analyzer may not have been able to determine the path of the flow from only the first and second flow records 160. In that case, additional flow records from additional routers 100 in the path would be necessary to determine the end-to-end path. However, even without the additional flow records, the first and second flow records may be sufficient to make inferences narrowing the number of possible paths.

The flow record analyzer 128 is configured to generate routing information, including information regarding changes in flow paths. By observing changes in flow records from a plurality of routers over time, the flow record analyzer 128 can make inferences when changes to flow paths occur. This information can provide a global picture of routing behavior across the network and provide a much better understanding of routing dynamics on short timescales than is otherwise possible. Continuing the last example, consider the first and second flow records as a first set of flow records generated by a first set of routers (100-1 and 100-6). A second set of routers (here a set of only one member, router 100-4) generates a second set of flow records (here a set of only one flow record). In this second set flow record, the source interface field 178 has a value associated with interface number 3 of router 100-4. The destination interface field 180 has a value associated with interface number 4 of router 100-4. The source port field 162, the source I P address field 164, the destination port field 166 and the destination IP address field 168 of the second set of flow records each match the respective fields of the first set of flow records, indicating the second set of flow records is associated with the same flow as the first set of flow records. Based on knowledge of the network topology and the first and second flow records, the flow record analyzer 128 can infer that the end to end path of the flow has changed. Specifically the flow record analyzer 128 can infer that the flow now enters the network 120 from LAN 122-1 on a communication link 132 connected to interface 2 of router 100-1 and exits through interface 3, enters router 100-2 through interface 1 and exits through interface 4, enters router 100-4 through interface 3 and exits through interface 4, enters router 100-6 through interface 1 and exits on interface 4, and is carried by communication link 132 to LAN 122-2. In general, the number of flow records needed in a second set of flow records in order to determine a new path for a flow depends on the topology of the network and the particular flow record that is exported. In this case, a single flow record from router 100-4 was sufficient to determine the new pathway.

The flow record analyzer 128 is configured to generate routing information, including information regarding changes to the network 120. Changes to the network 120 can include changes to the topology of the network 120, changes to status of one or more of the routers 100, or changes to status of one or more of the communication links 130 between routers 100. Continuing the last example, the flow record analyzer 128 can infer from the change in the path of the flow and knowledge of the topology of the network 120 that the communications link 130 between routers 100-4 and 100-1 has changed status. The communications link 130 between routers 100-1 and 100-4 may have failed or increased in cost. With more complex network topologies, additional sets of flow records may be needed in order to generate more narrow inferences or determinative conclusions about changes to the network 120.

The flow record analyzer 128 is configured to store the generated routing information. The routing information may then be transferred to network operators or planners for use in traffic engineering or network planning. In some embodiments, the flow record analyzer 128 is configured to send messages to the network manager 140 based on the routing information. For example, the flow record analyzer 140 may send an alert to the network manager 140 that the topology of the network 120 has changed. The alert may specifically indicate a particular router, router interface or link that has gone out of service.

Figure 4:
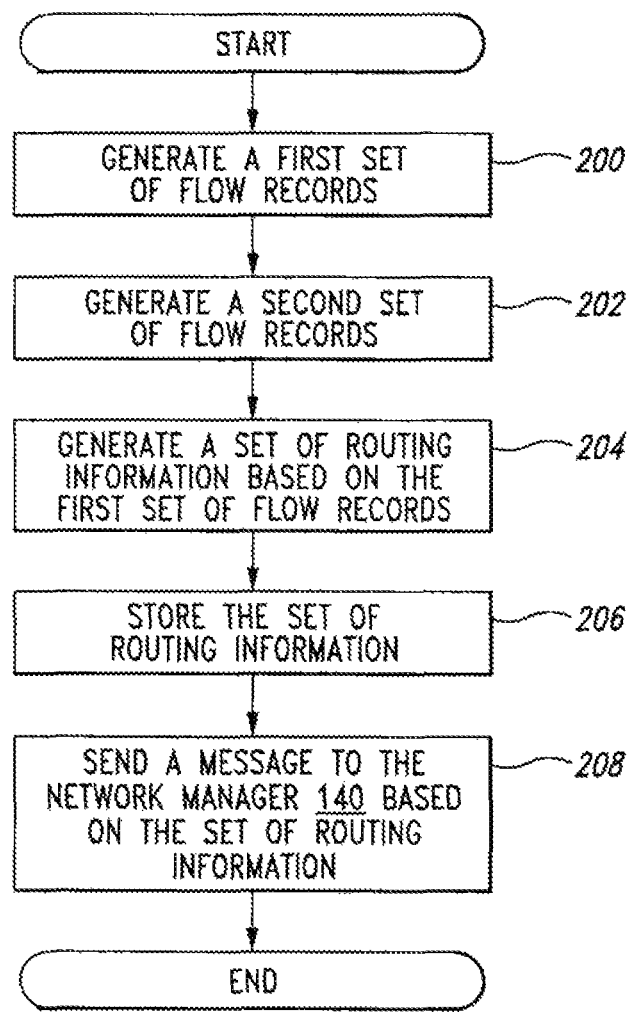
FIG. 4 is a flow chart showing a method for a system to generate routing information regarding routing properties of a network.

FIG. 4 is a flow chart showing a method by which a system can generate routing information regarding routing properties of a network. Step 200 directs generating a first set of flow records. Each flow record in the first set is generated at a different one of a first set of routers in the network. Each of the first set of flow records is related to a first packet flow passing through each of the first set of routers.

Step 202 directs generating a second set of flow records. Each flow record in the second set is generated at a different one of a second set of routers in the network. Each of the second set of flow records is related to a second packet flow. Some, all, or none of the routers in the second set of routers may also be in the first set of routers. In some cases, the second packet flow is the same packet flow as the first packet flow, allowing changes in the path of the first packet flow to be identified. In some embodiments, the second set of flow records is generated during a second time interval different than the first time interval during which the first set of flow records was generated, allowing changes in path or network topology to be identified.

Step 204 directs generating a set of routing information based on the first set of flow records. The generated routing information may include information about a routing table entry in one of the first set of routers. The routing information generated may include information about a path taken by the first packet flow through the network. The generated routing information may include information about changes to a topology of the network or a status of a router in the network or status of a link between routers in the network.

Step 206 directs storing the set of routing information. The routing information may also be sent to a network operator for review or further analysis.

Step 208 directs sending a message to the network manager 140 based on the set of routing information. For example, the message could inform the network manager 140 of a change in the topology of the network 120.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A method for generating network routing information regarding routing properties of a network comprising:
at a flow record collector, receiving from a first router in the network a first flow record regarding properties of a first packet flow as measured at the first router, the first flow record including a first source interface field identifying a first source interface of the first router where the first packet flow was received, and a first destination interface field identifying a first destination interface of the first router through which the first packet flow was sent based on a destination address of the first packet flow and based on a first router matrix of the first router, the first flow record being generated starting at initial detection of the first packet flow at the first router and ending at termination of the first packet flow at the first router;
at the flow record collector, receiving from a second router in the network a second flow record regarding properties of the first packet flow as measured at the second router, the second flow record including a second source interface field identifying a second source interface of the second router where the first packet flow was received, and a second destination interface field identifying a second destination interface of the second router through which the first packet flow was sent based on a destination address of the first packet flow and based on a second router matrix of the second router, the second flow record being generated starting at initial detection of the first packet flow at the second router and ending at termination of the first packet flow at the second router;
wherein the first and second flow records additionally include packet timestamp fields indicating times of initial detection and termination of the packet flow;
at a flow record analyzer, generating a set of routing information based on contents of the first and second source interface fields and the first and second destination interface fields; and
storing the set of routing information.

2. The method of claim 1 wherein generating the set of routing information further comprises generating information regarding changes to at least one of a topology of the network and a status of a router in the network and a link between routers in the network.

3. The method of claim 1 further comprising sending a message to a network manager based on the set of routing information.

4. The method of claim 1 wherein generating the set of routing information further comprises generating a first path information set regarding a path of the first packet flow through the network.

5. The method of claim 1 wherein the first and second flow records are generated by sampling fewer than all packets flowing through the routers.

6. A non-transitory computer-readable medium having stored thereon computer readable instructions for generating network routing information regarding routing properties of a network, wherein execution of the computer readable instructions by a processor causes the processor to perform operations comprising:
at a flow record collector, receiving from a first router in the network a first flow record regarding properties of a first packet flow as measured at the first router, the first flow record including a first source interface field identifying a first source interface of the first router where the first packet flow was received, and a first destination interface field identifying a first destination interface of the first router through which the first packet flow was sent based on a destination address of the first packet flow and based on a first router matrix of the first router, the first flow record being generated starting at initial detection of the first packet flow at the first router and ending at termination of the first packet flow at the first router;

at the flow record collector, receiving from a second router in the network a second flow record regarding properties of the first packet flow as measured at the second router, the second flow record including a second source interface field identifying a second source interface of the second router where the first packet flow was received, and a second destination interface field identifying a second destination interface of the second router through which the first packet flow was sent based on a destination address of the first packet flow and based on a second router matrix of the second router, the second flow record being generated starting at initial detection of the first packet flow at the second router and ending at termination of the first packet flow at the second router;

wherein the first and second flow records additionally include packet timestamp fields indicating times of initial detection and termination of the packet flow;

at a flow record analyzer, generating a set of routing information based on contents of the first and second source interface fields and the first and second destination interface fields; and storing the set of routing information.

7. The non-transitory computer-readable medium of claim 6 wherein generating the set of routing information further comprises generating information regarding changes to at least one of a topology of the network and a status of a router in the network and a link between routers in the network.

8. The non-transitory computer-readable medium of claim 6 further comprising sending a message to a network manager based on the set of routing information.

9. The non-transitory computer-readable medium of claim 6 wherein generating the set of routing information further comprises generating a first path information set regarding a path of the first packet flow through the network.

10. The non-transitory computer-readable medium of claim 6 wherein the first and second flow records are generated by sampling fewer than all packets flowing through the routers.

11. A data packet network, comprising:

a flow record collector including communication interfaces with first and second routers, a processor and a non-transitory computer-readable medium having stored thereon computer readable instructions for collecting flow records in the network, wherein execution of the computer readable instructions by the processor causes the processor to perform operations comprising:

receiving from the first router a first flow record regarding properties of a first packet flow as measured at the first router, the first flow record including a first source interface field identifying a first source interface of the first router where the first packet flow was received, and a first destination interface field identifying a first destination interface of the first router through which the first packet flow was sent based on a destination address of the first packet flow and based on a first router matrix of the first router, the first flow record being generated starting at initial detection of the first packet flow at the first router and ending at termination of the first packet flow at the first router;

receiving from the second router a second flow record regarding properties of the first packet flow as measured at the second router, the second flow record including a second source interface field identifying a second source interface of the second router where the first packet flow was received, and a second destination interface field identifying a second destination interface of the second router through which the first packet flow was sent based on a destination address of the first packet flow and based on a second router matrix of the second router, the second flow record being generated starting at initial detection of the first packet flow at the second router and ending at termination of the first packet flow at the second router;

wherein the first and second flow records additionally include packet timestamp fields indicating times of initial detection and termination of the packet flow;

a flow record analyzer including a communication interface with the flow record collector, a processor and a non-transitory computer-readable medium having stored thereon computer readable instructions for generating network routing information regarding routing properties of the network, wherein execution of the computer readable instructions by a processor causes the processor to perform operations comprising:

generating a set of routing information based on contents of the first and second source interface fields and the first and second destination interface fields; and storing the set of routing information.

12. The data packet network of claim 11 wherein generating the set of routing information further comprises generating information regarding changes to at least one of a topology of the network and a status of a router in the network and a link between routers in the network.

13. The data packet network of claim 11 further comprising sending a message to a network manager based on the set of routing information.

14. The data packet network of claim 11 wherein generating the set of routing information further comprises generating a first path information set regarding a path of the first packet flow through the network.

15. The data packet network of claim 11 wherein the first and second flow records are generated by sampling fewer than all packets flowing through the routers.

* * * * *